March 30, 1926.  1,579,059
E. W. AUSTIN
VEHICLE TIRE
Filed March 19, 1925
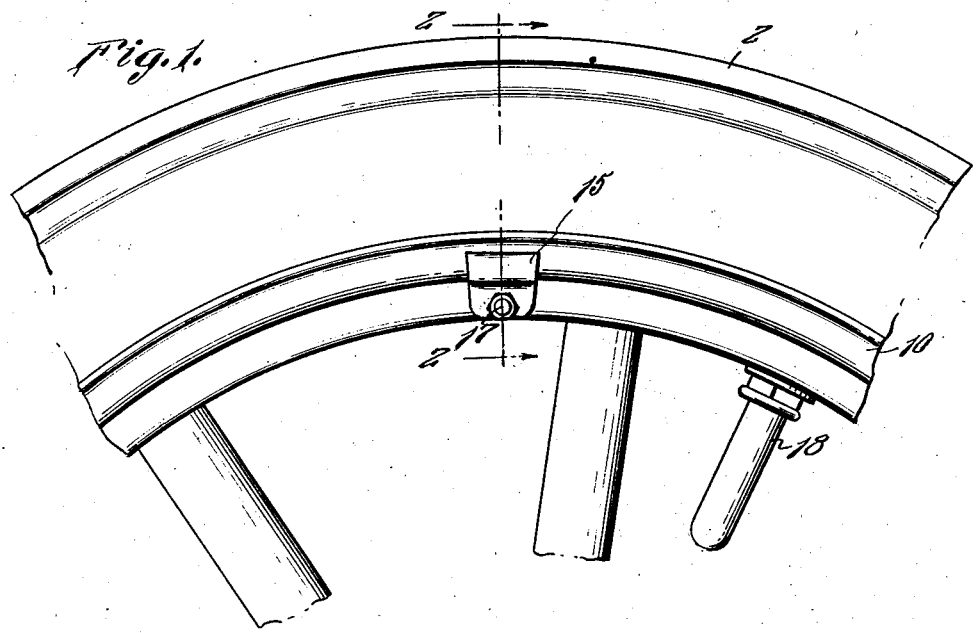
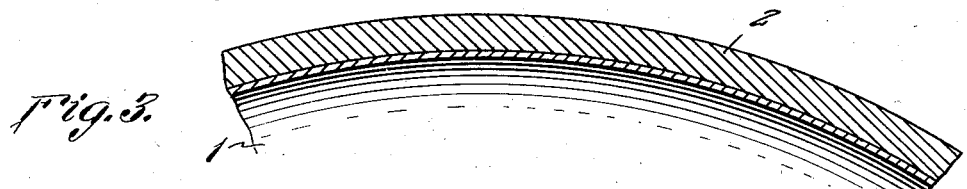
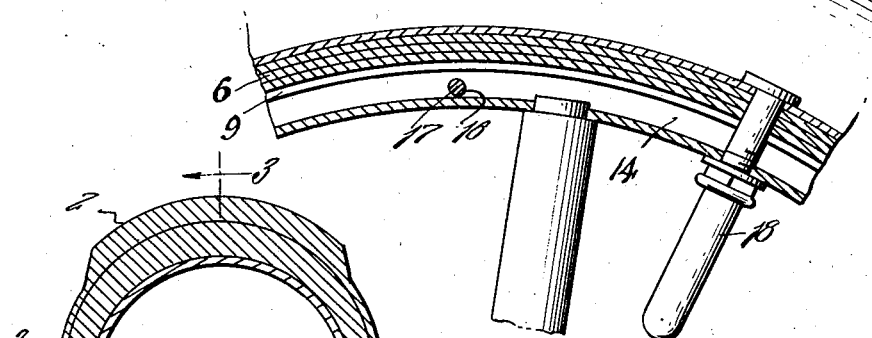
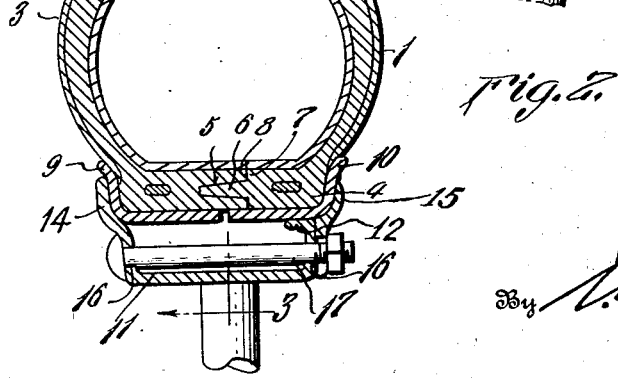
Inventor
E. W. Austin
By
Attorney Patented Mar. 30, 1926.

1,579,059

UNITED STATES PATENT OFFICE.

ENOCH W. AUSTIN, OF OKMULGEE, OKLAHOMA.

VEHICLE TIRE.

Application filed March 19, 1925. Serial No. 16,752.

*To all whom it may concern:*

Be it known that ENOCH W. AUSTIN, a citizen of the United States of America, residing at Okmulgee, in the county of Okmulgee and State of Oklahoma, has invented new and useful Improvements in Vehicle Tires, of which the following is a specification.

The purpose of the invention is to provide a tire constructed on the pneumatic principle and having all the advantages of the latter without the necessity of having to employ or use an inner or air holding tube such as customary in practice; to provide a construction interiorly accessible for repair when dismounted; and to provide a rim or mounting which will effectively serve to close the tire for the effective retention of air under pressure.

With this purpose in view, the invention consists in a construction and combination of parts of which a preferred embodiment is illustrated in the accompanying drawings, wherein:

Figure 1 is a view in side elevation of a portion of a tire constructed in accordance with the invention, together with the wheel and tire rims.

Figure 2 is a transverse sectional view on the plane indicated by the line 2—2 of Figure 1.

Figure 3 is a longitudinal sectional view on the plane indicated by the line 3—3 of Figure 2.

The tire, which is in the form of the ordinary shoe 1, is provided with the usual tread surface 2, the side walls 3 being reduced in thickness as in the usual shoe but terminating in inner circumferential bead members 4 which are separable on a line defining the inner circumferential split of the shoe. The bead members 4 interlock at the meeting line and though one is provided with a groove 5, the other carries a tongue 6 seating in the groove, the shoulders 7 on opposite sides of the tongue abutting the edges 8 on the opposite sides of the groove when the beads are interlocked.

Demounted, the beads may be separated and access thereby had to the interior of the tire for repairs; but, when mounted, the tire is designed to be carried by a clamping rim consisting of the complemental rim sections 9 and 10, these rim sections being of cross sectional contours like the cross sectional contours of the beads, and the latter seating in the ring sections when the same are seated upon the wheel felly 11. The wheel felly is preferably of channel shape and provided with a peripheral inner lip 12 against which the rim section 10 seats, the rim section 9 seating upon the peripheral edge of the flange 14 of the felly. The lugs 15 are disposed opposite holes 16 in the felly through which the bolts 17 pass, the bolts 17 engaging the lug and therefore forcing the rim section 10 toward the rim section 9, the latter being engaged by the flange 14.

The clamping operation is thus effected upon the beads 4 and the tongue forced into firm engagement with the groove and the shoulders 7 into engagement with the edges 8. The rim section 10 is flexible enough in construction to permit it being brought into firm binding engagement with the seated bead throughout the periphery of the latter and thus the circumferential split in the shoe defined by the meeting line of the two beads is securely closed. The tire may then be filled with air to the desired pressure by means of the air valve 18 which may be secured in place in any acceptable manner. The rim sections are so located that their relatively closely adjacent edges on a line passing radially through the center of the cross sectional area of the tire shoe, thereby supporting the tongue and groove connection, so as to prevent the meeting edges of the beads from expanding between the closely adjacent edges of the rim sections. The shoulders 7 and the edges 8 of the beads 4 closely engage each other and where they engage, they are offset to one side of the relatively close adjacent edges of the rim sections, thereby further preventing the meeting shoulders 7 and the edges 8 from expanding between the relatively close adjacent edges of the rim sections. The location of the meeting shoulders 7 and the edges 8, offset as above stated, prevents excessive moisture from reaching the tongue and groove connection and thereby prevents rotting away of the tongue 6.

The invention having been described, what is claimed as new and useful is:

The combination with a tire having a shoe of which the side walls terminate in beads with their inner peripheral portions provided with closely engaging meeting edges which define an inner circumferential split, said meeting edges having a closely fitting tongue and groove interlocking connection, of a clamping means comprising complemental rim sections respectively engaging said beads to draw and clamp the meeting edges closely together adjacent said connection, said rim sections having relatively close adjacent edges on a line passing radially through the center of the cross sectional area of the tire shoe and supporting the beads at a point immediately adjacent said tongue and groove connection, said meeting edges being offset to one side of the adjacent edges of the rim sections, thereby preventing the meeting edges from expanding between the relatively close adjacent edges of the rim sections.

In testimony whereof he affixes his signature.

ENOCH W. AUSTIN.